US008096706B2

(12) United States Patent
Lee

(10) Patent No.: US 8,096,706 B2
(45) Date of Patent: Jan. 17, 2012

(54) TEMPERATURE DETECTOR AND THE METHOD USING THE SAME

(75) Inventor: Wen Ming Lee, Kueishan (TW)

(73) Assignee: Nanya Technology Corporation, Kueishan (TW)

( * ) Notice: Subject to any disclaimer, the term of this patent is extended or adjusted under 35 U.S.C. 154(b) by 696 days.

(21) Appl. No.: 12/186,672

(22) Filed: Aug. 6, 2008

(65) Prior Publication Data
US 2009/0296779 A1 Dec. 3, 2009

(30) Foreign Application Priority Data
May 27, 2008 (TW) ................................. 97119467 A

(51) Int. Cl.
G01K 7/01 (2006.01)

(52) U.S. Cl. ............ 374/170; 374/1; 374/178; 702/130; 702/99

(58) Field of Classification Search .......... 374/170–173, 374/178, 183, 185, 100, 114, 1; 702/130–136, 702/99; 327/512–513
See application file for complete search history.

(56) References Cited

U.S. PATENT DOCUMENTS

| 3,620,082 | A | * | 11/1971 | Peters | 374/170 |
| 3,700,918 | A | * | 10/1972 | Kawashima | 327/350 |
| 3,749,823 | A | * | 7/1973 | Warner | 348/32 |
| 3,882,725 | A | * | 5/1975 | Rao et al. | 374/168 |
| 4,061,033 | A | * | 12/1977 | Nixon | 374/103 |
| 4,215,336 | A | * | 7/1980 | Smith | 340/870.17 |
| 4,369,352 | A | * | 1/1983 | Bowles | 219/413 |
| 4,575,806 | A | * | 3/1986 | Aldrich et al. | 702/133 |
| 4,602,871 | A | * | 7/1986 | Hanaoka | 374/102 |
| 4,636,092 | A | * | 1/1987 | Hegyi | 374/178 |
| 4,713,783 | A | * | 12/1987 | Fletcher | 702/133 |
| 4,730,941 | A | * | 3/1988 | Levine et al. | 374/170 |
| 4,771,393 | A | * | 9/1988 | Ishida et al. | 702/133 |
| 4,956,795 | A | * | 9/1990 | Yamaguchi et al. | 702/99 |
| 4,959,651 | A | * | 9/1990 | Yamada | 341/131 |
| 5,083,288 | A | * | 1/1992 | Somlyody et al. | 702/116 |
| 5,552,999 | A | * | 9/1996 | Polgreen et al. | 702/63 |
| 5,836,156 | A | * | 11/1998 | Watabe et al. | 60/276 |
| 5,940,785 | A | * | 8/1999 | Georgiou et al. | 702/132 |
| 6,169,442 | B1 | * | 1/2001 | Meehan et al. | 327/513 |
| 6,612,737 | B1 | * | 9/2003 | Lobban | 374/183 |
| 6,934,645 | B2 | * | 8/2005 | Kim | 702/64 |

(Continued)

FOREIGN PATENT DOCUMENTS

JP 55035337 A * 3/1980

(Continued)

OTHER PUBLICATIONS

Office Action issued in corresponding Chinese Application No. 2008101276348 on Jun. 7, 2010.

Primary Examiner — Gail Verbitsky
(74) Attorney, Agent, or Firm — Connolly Bove Lodge & Hutz LLP

(57) ABSTRACT

A temperature detector includes a plurality of comparators, an electronic component and a controller. Each of the comparators is responsible for detecting different temperature ranges. The electronic component has a temperature-dependent threshold voltage and an output connected to inputs of the plurality of comparators. The controller is configured to enable only one of the comparators at one time and to generate a value to the other inputs of the plurality of comparators.

5 Claims, 3 Drawing Sheets

U.S. PATENT DOCUMENTS

| | | | |
|---|---|---|---|
| 7,082,377 B1 * | 7/2006 | Aslan et al. | 702/130 |
| 7,084,695 B2 * | 8/2006 | Porter | 327/512 |
| 7,180,211 B2 * | 2/2007 | Sinha et al. | 307/651 |
| 7,310,013 B2 * | 12/2007 | Porter | 327/512 |
| 7,312,648 B2 * | 12/2007 | Yang | 327/512 |
| 7,322,743 B2 * | 1/2008 | Gozloo et al. | 374/170 |
| 7,427,158 B2 * | 9/2008 | Yoshida | 374/172 |
| 7,502,710 B2 * | 3/2009 | Ishikawa | 702/130 |
| 7,896,545 B2 * | 3/2011 | Pan | 374/178 |
| 2005/0063120 A1 * | 3/2005 | Sinha et al. | 361/103 |
| 2005/0099163 A1 * | 5/2005 | Liepold | 320/150 |
| 2006/0178852 A1 * | 8/2006 | Johns et al. | 702/130 |
| 2007/0098041 A1 * | 5/2007 | Seo | 374/170 |
| 2008/0082290 A1 * | 4/2008 | Jeong et al. | 702/130 |
| 2008/0144415 A1 * | 6/2008 | Macerola et al. | 365/211 |
| 2009/0110028 A1 * | 4/2009 | Goh et al. | 374/185 |
| 2010/0002747 A1 * | 1/2010 | Bosch et al. | 374/170 |
| 2011/0029272 A1 * | 2/2011 | Lee | 702/130 |

FOREIGN PATENT DOCUMENTS

| | | | |
|---|---|---|---|
| JP | 63041162 A | * | 2/1988 |
| JP | 05157629 A | * | 6/1993 |
| JP | 06016527 A | * | 1/1994 |

* cited by examiner

TEMPERATURE DETECTOR AND THE METHOD USING THE SAME

BACKGROUND OF THE INVENTION

1. Field of the Invention

The present invention relates to a temperature detector and the method using the same, and more particularly to a temperature detector using a plurality of comparators and the method using the same.

2. Description of the Related Art

Most electronic appliances or components are sensitive to variance of operating temperature. For example, the output performance of digital cameras is significantly affected by the operating temperature. Temperature variation also affects the operating points and operating speed of ICs. To facilitate more stable performance, most electronic appliances use a temperature detector to detect outside temperature and compensate signals accordingly.

FIG. 1 shows a well-known temperature detector. The inputs of a multiplexer 11 are connected to voltage dividers 15, the permutation of which is in a descending order. The output Vres of the multiplexer 11 and the output Vdiode of a diode 14 are used as inputs of a comparator 12. If Vres is greater than Vdiode, the comparator 12 notifies a controller 13 to reduce the value of mul-sel signal of the multiplexer 11 for selecting a smaller Vres in the next iteration. Through several iterations, the controller 13 obtains a Vres value closest to Vdiode. The controller 13 obtains the current IC operation temperature with reference to the ultimum Vres and an internal temperature mapping table.

Current trends show the operating voltages of electronic components have been decreasing, which increases design complexity of a comparator. For example, when the operating temperature of a temperature detector is from −40° C. to 120° C., the voltage variation of the diode voltage is in a range of 0.824 to 0.510. For a comparator design, a low voltage power supply and large input voltage variation will result in extra cost and complexity.

SUMMARY OF THE INVENTION

The temperature detector in accordance with one embodiment of the present invention comprises a first multiplexer, an electronic component, a first comparator, a second comparator, a second multiplexer and a controller. The first multiplexer has a plurality of input terminals connected to voltage-dividing resistors. The electronic component has a temperature-dependent threshold voltage. The first comparator has input terminals connected to the outputs of the electronic component and the first multiplexer. The second comparator has input terminals connected to the outputs of the electronic component and the first multiplexer. The second multiplexer is connected to the outputs of the first and second comparators. The controller is connected to the output of the second multiplexer and is configured to generate selecting and enabling signals of the first and second comparators. The first and second comparators me responsible for detecting different temperature ranges.

The temperature detector in accordance with one embodiment of the present invention comprises a plurality of comparators, an electronic component and a controller. Each of the comparators is responsible for detecting different temperature ranges. The electronic component has a temperature-dependent threshold voltage and an output connected to inputs of the plurality of comparators. The controller is configured to enable only one of the comparators at one time and to generate a value to the other inputs of the plurality of comparators.

The method of using a temperature detector in accordance with one embodiment of the present invention comprises the steps of: enabling a first comparator and disabling a second comparator, wherein one input terminal of the first comparator and one input terminal of second comparator are connected to an electronic component with a temperature-dependent threshold voltage, and the first and second comparators are responsible for detecting different temperature ranges; inputting a test data to the other input terminals of the first and second comparators; utilizing the outputs of the first and second comparators to update the test data and then feed back to the first and second comparators; and enabling the second comparator and disabling the first comparator if the test data is greater than a switching value.

BRIEF DESCRIPTION OF THE DRAWINGS

The invention will be described according to the appended drawings in which.

PREFERRED EMBODIMENT OF THE PRESENT INVENTION

Figure 1:
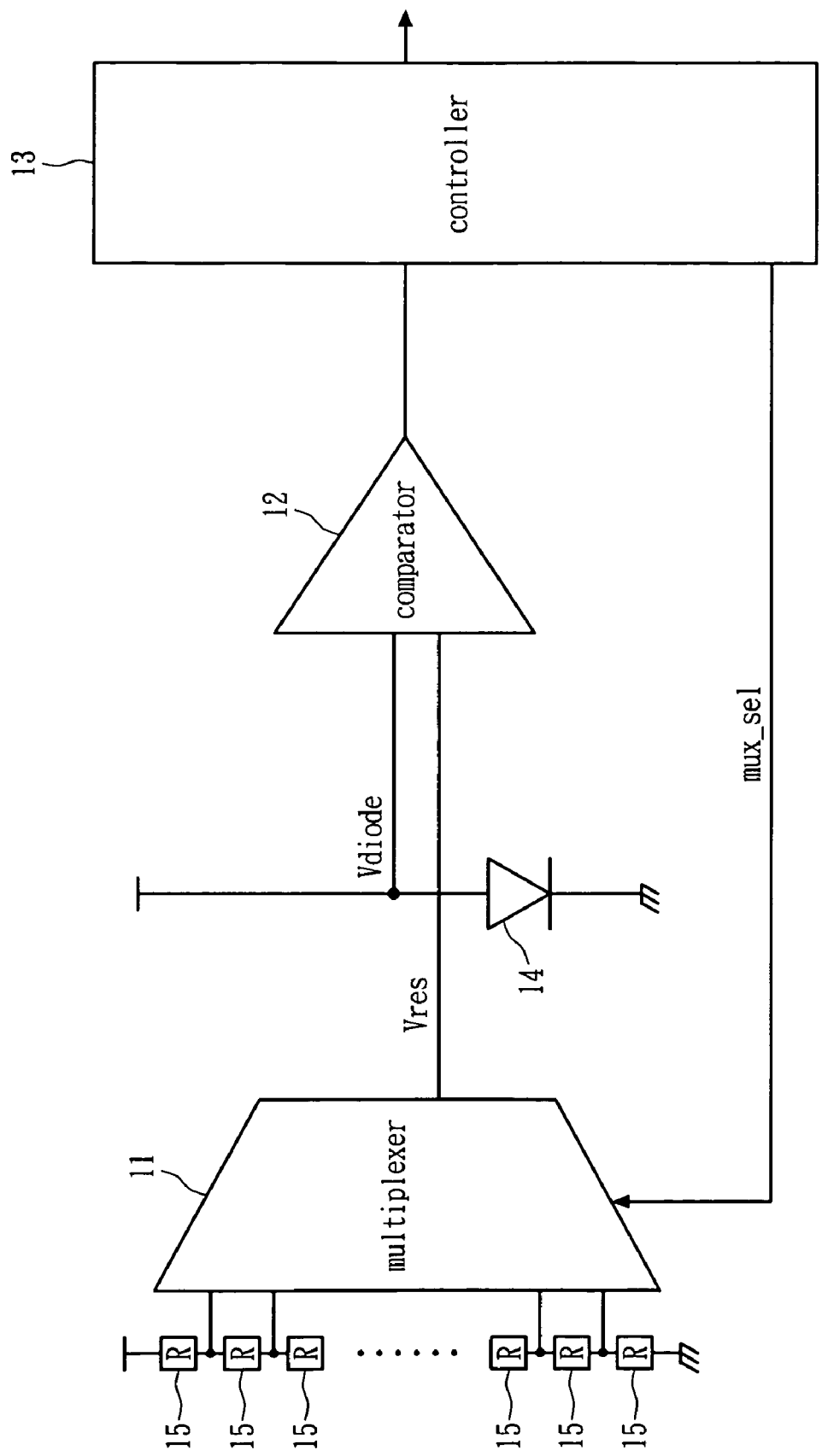
FIG. 1 shows a well-known temperature detector.
Figure 2:
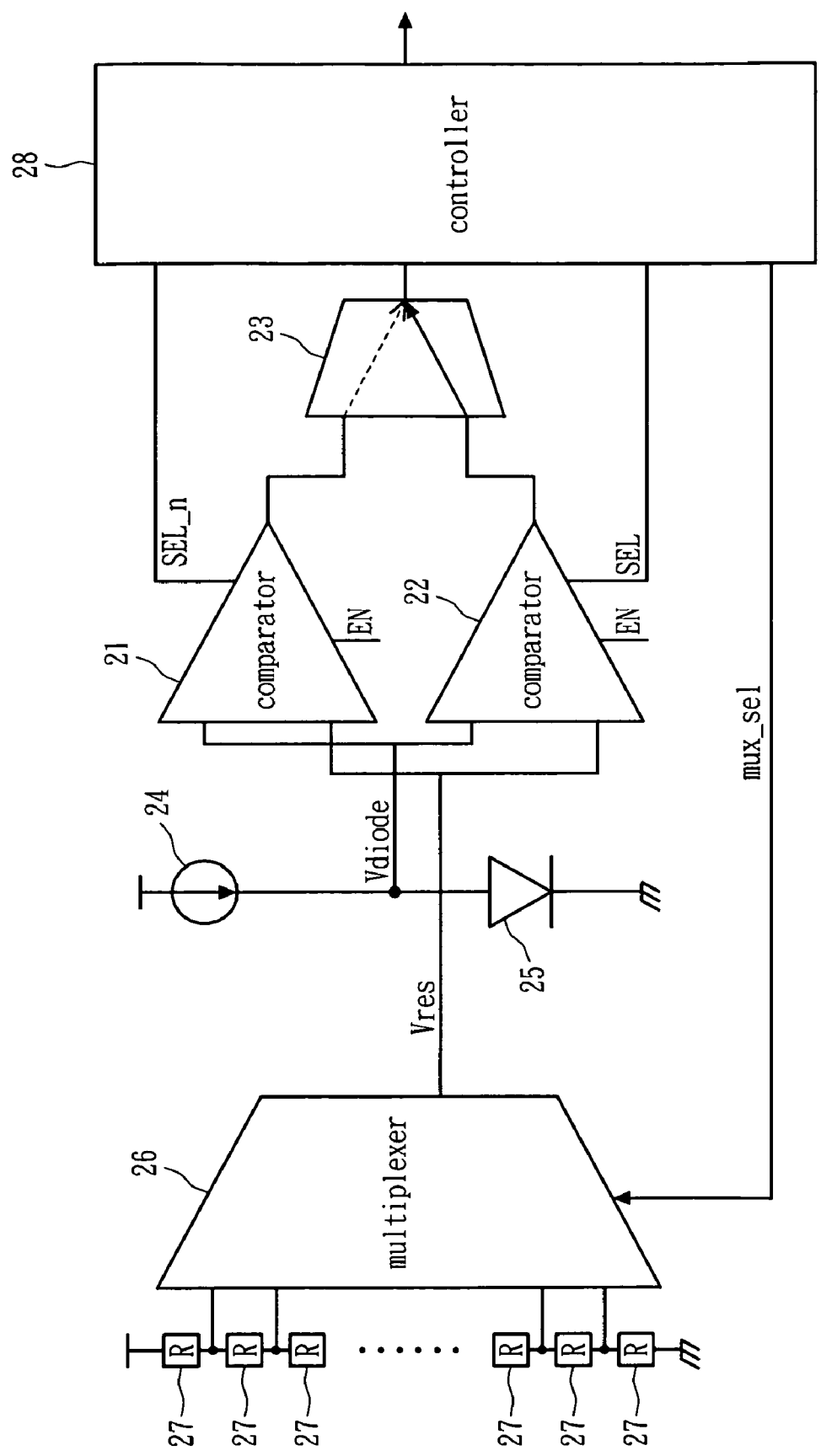
FIG. 2 shows a temperature detector according to one embodiment of the present invention.

FIG. 2 shows a temperature detector according to one embodiment of the present invention. A first comparator 21 is operated in a temperature range between 120° C. and 40° C., and its corresponding voltage variance is between 0.51 volts and 0.67 volts. A second comparator 22 is operated in a temperature range between 40° C. and −40° C., and its corresponding voltage variance is between 0.67 volts and 0.82 volts. A comparison between the first comparator 21 and second comparator 22 is conducted every 64 μs. The comparison between the first comparator 21 and the second comparator 22 is then transferred to a controller 28 through a second multiplexer 23. Because the first comparator 21 and second comparator 22 are not always working, the controller 28 can use an EN signal to enable them when necessary. The controller 28 includes an initial test data, e.g., 1110000 in a binary format, representing 88° C. Upon stat, the controller 28 enables the first comparator 21 and disables the second comparator 22 by SEL_n signal, and the initial test data selects a corresponding voltage divider Vres of the first multiplexer 26 and then compares with a temperature-dependent output voltage of an electronic component. The electronic component, e.g., a diode 25, has a temperature-dependent threshold voltage such that its output voltage is changeable in relation to temperature variance. The diode 25 is connected to a voltage supply through a current supply 24. If the first comparator 21 detects that $V_{res}$ is greater than $V_{diode}$, then the controller 28 decreases the initial test data and proceeds the next iteration. In contrast, if the first comparator 21 detects that $V_{res}$ is smaller than $d_{diode}$, then the controller 28 increases the initial test data and proceeds the next iteration. The increasing or decreasing actions may be processed by a counter (not shown) inside the controller 28. During the iteration, the controller 28 also determines whether the test data is equal to a switching value (e.g., 1101101 in the binary format), wherein the switching value represents a value corresponding to 40° C. When the controller 28 finds the test data is equal to the switching value, the controller 28 uses a SEL signal to enable the second comparator 22 and disable the first comparator 21. Subsequently, the comparison between signals $V_{res}$ and $V_{diode}$ is conducted through the second comparator 22. Alternatively, the embodiment can further use more than two comparators to make the comparison work for reducing input voltage variation range of individual comparators. Because the input voltage variation range of individual comparators becomes small, the first comparator 21 and second comparator 22 are still easily designed even when the operating voltage becomes lower. In addition, utilizing a plurality of comparators can cover a broader temperature range, e.g., 180° C. to −60° C., without extensively modifying the controller circuit.

Figure 3:
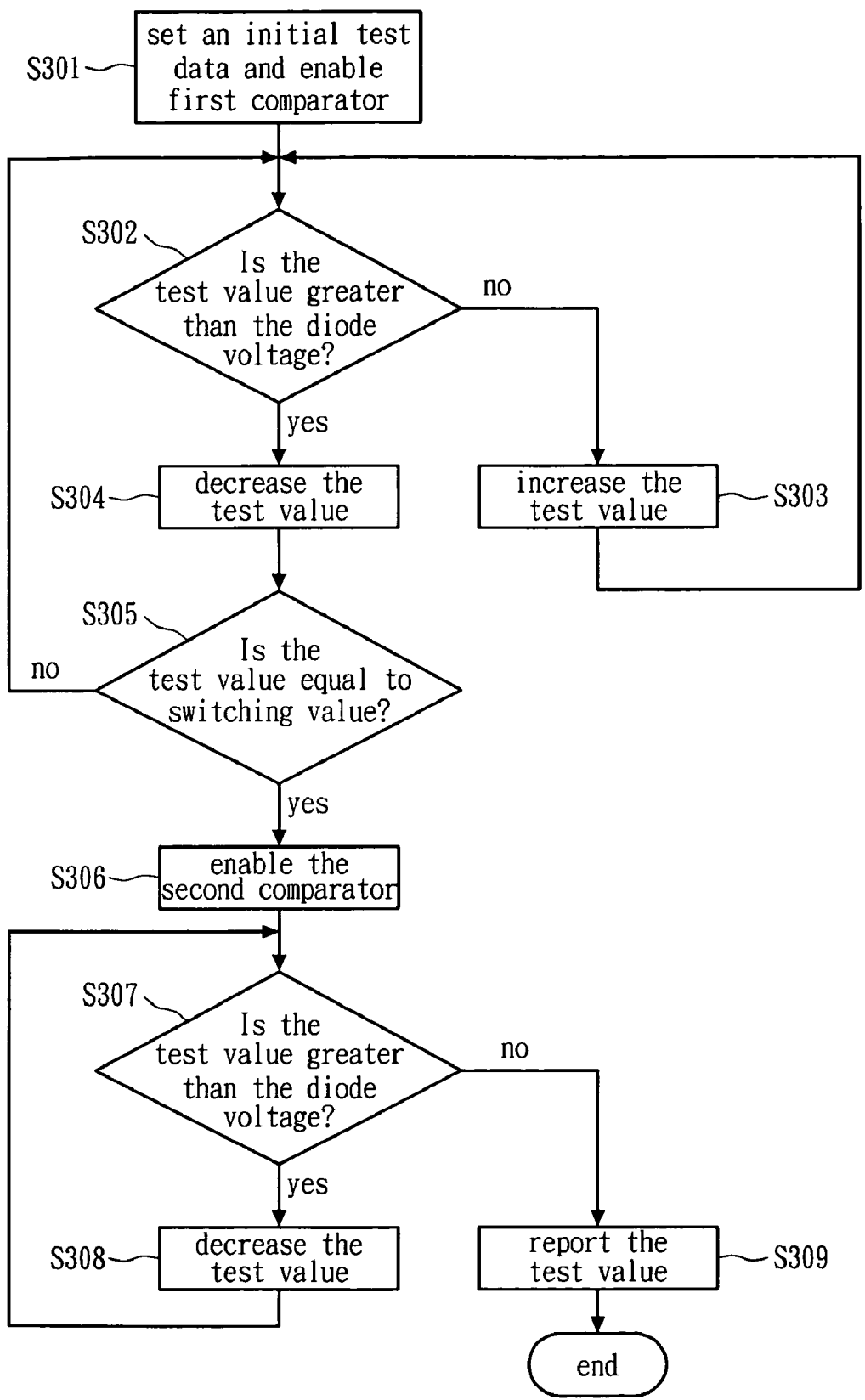
FIG. 3 shows a flow chart of switching voltage regulator in accordance with one embodiment of the present invention.

FIG. 3 shows a flow chart of controlling a switching voltage regulator in accordance with one embodiment of the present invention. In Step S301, an initial test data is set and the first comparator is enabled. In Step S302, if the test data is greater than the diode voltage, then Step S304 is activated to decrease the test data. Otherwise, Step S303 is entered to increase the test data. Step S305, which follows Step S304, is entered to compare whether the test data is equal to a switching value. If the answer is affirmative, Step S306 is entered to enable the second comparator and disable the first comparator. In Step S307, if the test data is greater than a diode voltage, Step S308 is entered to decrease the test data. Otherwise, Step S309 is entered to report the test data.

The above-described embodiments of the present invention me intended to be illustrative only. Numerous alternative embodiments may be devised by persons skilled in the art without departing from the scope of the following claims.

What is claimed is:

1. A temperature detector, comprising:
   a first multiplexer having a plurality of input terminals connected to voltage dividers;
   an electronic component with a temperature-dependent threshold voltage;
   a first comparator having input terminals connected to outputs of the electronic component and the first multiplexer;
   a second comparator having input terminals connected to outputs of the electronic component and the first multiplexer;
   a second multiplexer connected to the outputs of the first and second comparators; and
   a controller connected to the output of the second multiplexer and configured to generate selecting and enabling signals of the first and second comparators;
   wherein the first and second comparators are responsible for detecting different temperature ranges.

2. The temperature detector of claim 1, wherein the controller enables the first comparator or second comparator by an enabling signal.

3. The temperature detector of claim 1, wherein only one of the first and second comparators is enabled at one time.

4. The temperature detector of claim 1, wherein the electronic component is a diode.

5. The temperature detector of claim 4, wherein the diode is connected to a voltage supply through a current supply.

\* \* \* \* \*